(12) United States Patent
Gonzalez Mena

(10) Patent No.: US 7,216,735 B2
(45) Date of Patent: May 15, 2007

(54) HYBRID TRACTION SYSTEM FOR VEHICLES

(76) Inventor: Francisco Gonzalez Mena, Calle Real 91, Estepona (ES) E-29680

( * ) Notice: Subject to any disclaimer, the term of this patent is extended or adjusted under 35 U.S.C. 154(b) by 274 days.

(21) Appl. No.: 10/503,580

(22) PCT Filed: Feb. 6, 2003

(86) PCT No.: PCT/ES03/00068

§ 371 (c)(1),
(2), (4) Date: Aug. 4, 2004

(87) PCT Pub. No.: WO03/066360

PCT Pub. Date: Aug. 14, 2003

(65) Prior Publication Data

US 2005/0079951 A1    Apr. 14, 2005

(30) Foreign Application Priority Data

Feb. 7, 2002  (ES) ............................... 200200302

(51) Int. Cl.
*B60K 3/00* (2006.01)
(52) U.S. Cl. .................................. 180/165; 180/302
(58) Field of Classification Search ................ 180/165, 180/302, 304; 123/179.31, 527, 528; 60/598
See application file for complete search history.

(56) References Cited

U.S. PATENT DOCUMENTS

| 3,986,575 | A |   | 10/1976 | Eggmann |            |
|-----------|---|---|---------|---------|------------|
| 4,123,910 | A |   | 11/1978 | Ellison, Sr. |       |
| 4,163,367 | A | * | 8/1979  | Yeh ............................. | 60/414 |
| 4,361,204 | A | * | 11/1982 | Earle .......................... | 180/302 |
| 4,798,053 | A | * | 1/1989  | Chang ......................... | 60/712 |
| 5,549,174 | A | * | 8/1996  | Reis ............................. | 180/165 |
| 6,202,782 | B1| * | 3/2001  | Hatanaka .................... | 180/301 |
| 6,659,212 | B2| * | 12/2003 | Geisse et al. .............. | 180/65.2 |

FOREIGN PATENT DOCUMENTS

| DE | 199 46 711 A1 | 4/2001 |
| EP | 0 645 272 A1  | 3/1995 |
| EP | 0 779 419 A2  | 6/1997 |
| GB | 1 357 696     | 6/1974 |

\* cited by examiner

*Primary Examiner*—Frank Vanaman
(74) *Attorney, Agent, or Firm*—Adams Evans P.A.

(57) ABSTRACT

A hybrid drive system for vehicles. The system includes the connection of an engine and a motor, one as a combustion engine (1) and the other as a pneumatic motor (2), with this connection being made through a mechanical coupling (3) and, at once, through a pneumatic connection between the exhaust (8) of the pneumatic motor (2) and the input (9) of the combustion engine (1), including a control unit (19) which controls both the coupling (3) and the engine (1) and motor (2) and supplementary equipment associated to the latter. The pneumatic and mechanical coupling between both engine (1) and motor (2) provides comburent overfeeding to the combustion engine (1) and, at the same time, a sum of the drives provided by both engine and motor, with this sum of drives being applied to the pertinent clutch (6) of the system, in order to achieve a reduction in the consumption of the latter and greater power.

7 Claims, 1 Drawing Sheet

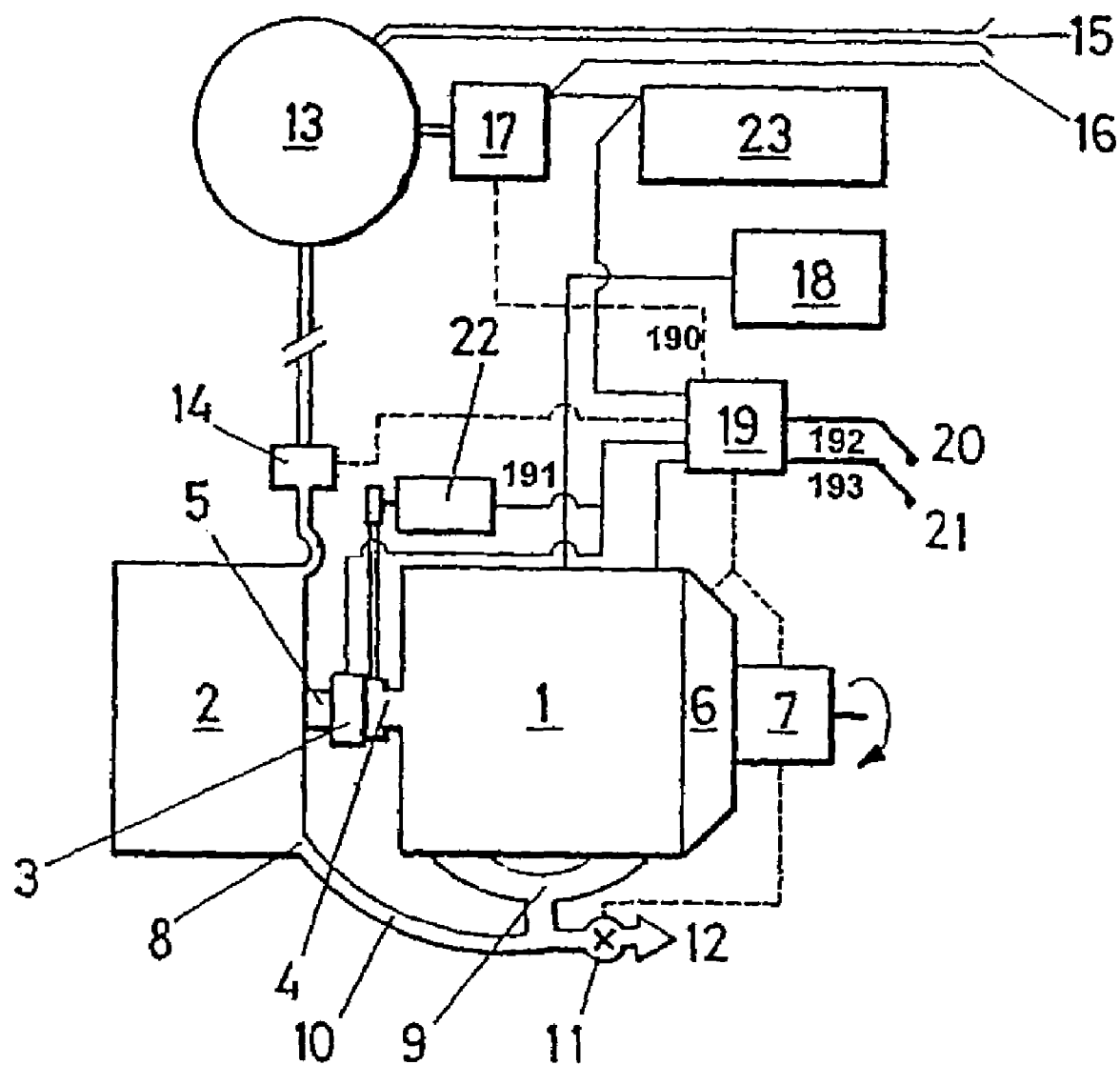

HYBRID TRACTION SYSTEM FOR VEHICLES

SUBJECT OF THE INVENTION

This is a national phase application of International Application PCT/ES03/00533, filed Feb. 6, 2003, and claims priority to Spanish Patent Application No. P200200302, filed Feb. 7, 2002. This invention refers to a hybrid drive system with a pneumatic motor and a combustion engine with air supercharging by means of the pneumatic motor with the aim of reducing the said combustion engine's fuel consumption, as well as providing a combined drive of both motor and engine to the system's pertinent clutch.

The system is based on mechanically and pneumatically coupling a pneumatic motor and a combustion engine so that the former's exhaust is connected to the combustion engine's input in order to provide supercharging and also drive by the mechanical connection between both the motor and the engine that is performed, for instance, through their crankshafts so that their aggregate drives are transmitted to the system's pertinent clutch.

The drive system consists in a motor and an engine which will always be pneumatically and mechanically connected, depending on the drive model.

BACKGROUND TO THE INVENTION

Combustion engine supercharging is a technique that has been used for many years, with the purpose of saving fuel and also providing the engine with greater power.

supercharging through mechanical operation based on a compressor which compresses the fluid in the combustion engine input are known, although, after years of experiments, this manner of supercharging has been rejected since consumption in the engine is penalised compared to a natural induction engine. The most widespread way is turbo-compression, in its different alternatives.

Another way of supercharging combustion engines is based on using the exhaust gases of a pneumatic motor soundly interlocked therewith, so that supercharging is external and it is necessary to store the compressed air in tanks and proportion it at a certain pressure so that a pneumatic motor gives an appropriate flow of air in its exhaust applicable to the actual combustion engine itself, even though the pneumatic motor's exhaust is not at atmospheric pressure but at that of the combustion engine's supercharging which diminishes performance.

European patent 965000441 describes a supercharging system based on an electric compressor acting on the combustion engine.

In any event, although many combustion engine supercharging systems are known, up to the present time, no optimum performance has been achieved since, in those cases where the performance is theoretically high, consumption does not diminish which is why the object of this invention is to design supercharging produced by the exhaust gases of a pneumatic motor, which is mechanically interlocked to the combustion engine through, for example, the joining of their crankshafts, which it defines as hybrid-drive.

DESCRIPTION OF THE INVENTION

The hybrid drive system with supercharging of the combustion engine being provided for is based on the coupling between a combustion engine and a pneumatic motor with, on the one hand, a mechanical connection, for example, between the crankshafts of both motor and engine with the combustion engine not requiring the classic starter motor, whilst, on the other, the connection or coupling between both motor and engine is pneumatic where the pneumatic motor's exhaust is connected to the combustion engine's input to supercharge the latter with comburent.

Naturally, the pneumatic motor is supported on a system which includes high pressure air tanks, an electric compressor for recharging, a control valve and a regulation system, etc., with the capacity of the actual pneumatic system itself being proportional to the fuel saving in the combustion engine.

Both motor and engine may be coupled according to different positions, i.e., with the pneumatic motor next to the clutch, by using a coupling system which joins the crankshafts of both motor and engine so that drive can be provided in this type of connection without the combustion engine operating, by uncoupling and opening its exhaust to the atmosphere. Another type of coupling is when the combustion engine is arranged next to the clutch, it being necessary for the latter to be operating in order to achieve drive whilst a third case or manner of connection or coupling is similar to that mentioned first, although without mechanically connecting to the combustion engine, whilst keeping the pneumatic connection which by supercharging it, recharges from the air tanks using a compressor.

The connection between both motor and engine should preferably be carried out so that the combustion engine is located next to the clutch of the vehicle and the pneumatic motor connected to the other end of the crankshaft of the combustion engine, using a semi-automatic transmission and including 42 volt alternator technology since this electric capacity is that which allows for self-charging when running and stopped.

The system also includes a control centre whereby it is possible to automatically uncouple both motor and engine, i.e., their crankshafts. This device may be an electric clutch allowing for smooth uncoupling.

Likewise, the system includes an electro-valve fitted to the outlet of the exhaust of the pneumatic motor at its connection with the input of the combustion engine, which electro-valve communicates with the outside through an air filter, all such that with both motor and engine running at the same time, the pneumatic motor supplies pressurised air to the input of the combustion engine, transmitting their two drives added together to the pertinent clutch of the combustion engine.

The aforementioned electro-valve is closed and the coupling system between both crankshafts coupled so that when the pneumatic motor is not running, the electro-valve is open, guaranteeing the air supply of the combustion engine and the coupling between them both is free.

The system also comprises a pressurised air tank, a valve control, a self-charging system, a high capacity battery, a fuel tank, as well as an external compressed air take-off in connection with the pressurised air tank and an external electrical take-off for supplying the self-charging system, for recharging the air tanks so that the electric take-off referred to may be connected to the said high capacity battery.

The fact of not being able to separate the drive system from the supercharging system is because the said system uses the exhaust gases of a pneumatic motor to supply a combustion engine and achieve a reduction in fuel consumption, based on a connection, both mechanical and pneumatic, between both motor and engine. That is to say, achieving a hybrid combustion-pneumatic drive involves supercharging the combustion engine.

DESCRIPTION OF THE DRAWINGS

This descriptive report is accompanied by a single sheet of drawings to supplement the description to be given hereafter, with the aim of aiding in greater understanding of the characteristics of the invention. The said sheet forms an integral part thereof, schematically showing the overfeeding system of a combustion engine, all in accordance with the object of the invention and describing when the combustion engine is next to the clutch of the vehicle as preferent.

PREFERENT EMBODIMENT OF THE INVENTION

Based on the aforementioned figure, it can be seen how the system of the invention comprises a combustion engine 1 and a pneumatic motor 2, both connected by means of a coupling 3 which may be direct or go through belts and pulleys, which coupling 3 corresponds to crankshafts 4 and 5 of both motor and engine, respectively combustion 1 and pneumatic 2.

Combustion engine 1 has the pertinent clutch 6 and its gearbox 7, through which movement is transmitted to a wheel, as is conventional.

Nevertheless, according to the invention, it may be conceived that the clutch device 6 and the gearbox are on the side of the pneumatic motor 2.

Apart from the mechanical connection or coupling 3 between crankshafts 4 and 5 of both combustion engine 1 and pneumatic motor 2, there is a pneumatic connection or coupling between them both, consisting in the outlet or exhaust 8 of the gases of the pneumatic motor 2 connecting to the input 9 of the combustion engine, through a pressure pipe 10, with an electro-valve 11 which communicates with the outside through an air filter 12.

The air overfeeding as provided by pneumatic motor 2 to combustion engine 1, in combination with the mechanical connection between crankshafts 4 and 5 of both, achieves a sum of power when connecting both crankshafts, with combustion engine 1 not requiring a starter motor, apart from achieving comburent overfeeding to the said combustion engine 1, from exhaust 8 of the pneumatic motor to input 9 of that combustion engine 1.

The pneumatic motor is supplemented with a pneumatic system comprising compressed air tank 13 which provides drive when operating on the pneumatic motor 2, transmitting it to the crankshaft or power take-off of combustion engine 1, and, at the same time, the air it needs through input 9 of the latter.

The system also comprises an external compressed air take-off 15, an external electric power take-off 16, a self-charging system 17, for example, an electric compressor, a fuel tank 18 for the combustion engine 1, and a control unit or centre 19 associated to the pertinent operators of the accelerator 20 and brake 21 through control entries 192, 193, for electric signals generated by the said operators 20 and 21.

At the request of the accelerator 20 of the vehicle, the control centre 19 controls the control valve 14 of pneumatic motor 2, as well as the fuel injection module of combustion engine 1, producing a revolution at the same rate if the coupling is direct and at another rate using pulleys and a belt.

The capacity of the pneumatic system and the possibility of electric or pneumatic recharging delimit its use in low consumption.

Coupling 3 between crankshafts 4 and 5 of both motors 1 and 2 may be uncoupled by an order transmitted by the control unit or centre itself 19.

In this way, with both engine 1 and motor 2 running at the same time, the pneumatic motor 2 supplies pressurised air through pipe 10 to the input 9 of the combustion engine 1, transmitting both drives added together to the clutch 6. The electro-valve 11 is closed and coupling 3 coupled, so that when pneumatic motor 2 is not running, that electro-valve 11 is open, guaranteeing air to the combustion engine 1, with coupling 3 remaining free.

On its part, the control unit or centre 19 regulates the control valve 14, the coupling 3, the electro-valve 11, clutch 6, gearbox 7, to respond to the accelerator 20 or brake 21, apart from regulating the above mentioned parameters both of the combustion engine and the pneumatic motor, producing a smooth operation, and must allow several programmes or functions, such as braking with the pneumatic motor, charging the tank 13 with air or monitoring the alternator 22, which keeps the battery charged.

Finally, the system is supplemented with the battery 23 which can also be recharged through the external electric take-off device 16, allowing the air tanks 13 to be recharged, activating the self-recharging system (17) without external connections.

The discontinuous line in the said figure indicates the connections between the control unit 19 and the self-recharging system 17; the control valve 14; the clutch and the electro-valve 11, with the control outlets of the control unit 19 which serve to respectively control the self-recharging system 17 and the alternator 22 being indicated with references 190 and 191.

The invention claimed is:

1. Hybrid drive system for vehicles that comprises:

A combustion engine (1) with an air input (9), an alternator (22) and a fuel tank (18);

A pneumatic compressed air motor (2) with an electro-pneumatic control valve (14), an air exhaust (8) and a compressed air tank (13);

A clutch (6) and a gearbox (7) for applying drive of the combustion engine and pneumatic motor (1, 2)

Characterised, in that this system additionally comprises:

A mechanical coupling device (3) for coupling/uncoupling the respective combustion engine (1) and pneumatic motor (2), so that the drive of both may be added together;

A pneumatic coupling device made up of a pneumatic tube (10), an electro-pneumatic valve (11) and an air filter (12) with an outlet to the outside, for connecting the air exhaust (8) of the pneumatic motor (2) to the air input (9) of the combustion engine (1), so that comburent supercharging is provided to the combustion engine (1); and An electronic control unit (19) for governing the combustion engine (1), the mechanical coupling device (3), the clutch (6), the gearbox (7), the electro-pneumatic valve (11), the control valve (14), and the alternator (22).

2. A system according to claim 1, characterised in that the clutch (6) and the gearbox (7) are fitted on the combustion engine (1).

3. A system according to claim 1, characterised in that the mechanical coupling device (3) is arranged between a crankshaft (4) of the combustion engine (1) and a crankshaft (5) of the pneumatic motor (2).

4. A system according to claim 3, characterised in that the mechanical coupling device (3) is a direct coupling.

5. A system according to claim 1, characterised in that the compressed air tank (13) is pneumatically connected to a compressor (17) electrically supplied by a high capacity electric battery (23).

6. A system according to claim 5, characterised in that an external electric take-off is provided for an alternative electric power supply of a compressor (17).

7. A system according to claim 5 or 6, characterised in that the electronic control unit (19), which is supplied by a high capacity electric battery (23) also has a control output (190) for controlling the compressor (17) and another control output (191) for controlling the alternator (22), as well as respective control inputs (192, 193) for electric signals as generated from an accelerator system (20) and from a brake system (21) of the vehicle.

\* \* \* \* \*